(12) United States Patent
Curry, Jr.

(10) Patent No.: US 9,751,604 B1
(45) Date of Patent: Sep. 5, 2017

(54) CUTTING DEVICE FOR WATER VESSEL

(71) Applicant: Ward E. Curry, Jr., Venice, FL (US)

(72) Inventor: Ward E. Curry, Jr., Venice, FL (US)

( * ) Notice: Subject to any disclaimer, the term of this patent is extended or adjusted under 35 U.S.C. 154(b) by 176 days.

(21) Appl. No.: 14/740,850

(22) Filed: Jun. 16, 2015

Related U.S. Application Data

(60) Provisional application No. 62/013,538, filed on Jun. 18, 2014, provisional application No. 62/062,432, filed on Oct. 10, 2014.

(51) Int. Cl.
*B63H 5/16* (2006.01)
*A01D 44/00* (2006.01)
*A01D 44/02* (2006.01)

(52) U.S. Cl.
CPC ............. *B63H 5/165* (2013.01); *A01D 44/00* (2013.01); *A01D 44/02* (2013.01)

(58) Field of Classification Search
USPC .................................................. 30/154, 204
See application file for complete search history.

(56) References Cited

U.S. PATENT DOCUMENTS

| | | | |
|---|---|---|---|
| 1,269,139 A * | 6/1918 | Welch | A01D 44/00 56/8 |
| 2,690,728 A | 10/1954 | Cavanaugh | |
| 3,837,077 A * | 9/1974 | Filter | D03D 47/00 30/231 |
| 4,224,893 A | 9/1980 | Vollmar | |
| 4,651,420 A | 3/1987 | Lonnecker | |
| 4,718,871 A | 1/1988 | Mendelevitch | |
| 4,801,281 A | 1/1989 | Govan | |
| 4,902,255 A | 2/1990 | Faunda | |
| 4,911,664 A | 3/1990 | Gremillion | |
| 4,925,412 A | 5/1990 | Karls | |
| 5,142,849 A * | 9/1992 | Amimoto | A01D 44/00 56/8 |
| 5,178,565 A | 1/1993 | Jacobson | |
| 5,201,168 A | 4/1993 | Jenson | |
| 5,430,998 A | 7/1995 | Albrecht | |
| 5,807,150 A | 9/1998 | Minter, Sr. | |

* cited by examiner

*Primary Examiner* — Alicia Torres
(74) *Attorney, Agent, or Firm* — Frijouf, Rust & Pyle, P.A.

(57) ABSTRACT

A cutting device for coupling to a water vessel propelling device. The cutting device comprises a base extending between a proximal end and a distal end and is coupled to a shaft of the water vessel propelling device. An upper arm is coupled to the base. A lower arm is coupled to the base. A track extends along the base. A blade slidably engages within the track for displacing between the upper arm and the lower arm. An actuator displaces the blade relative to the track. A cutting edge is on the blade for severing a foreign object that is positioned between the upper arm and the lower arm of the base.

12 Claims, 8 Drawing Sheets

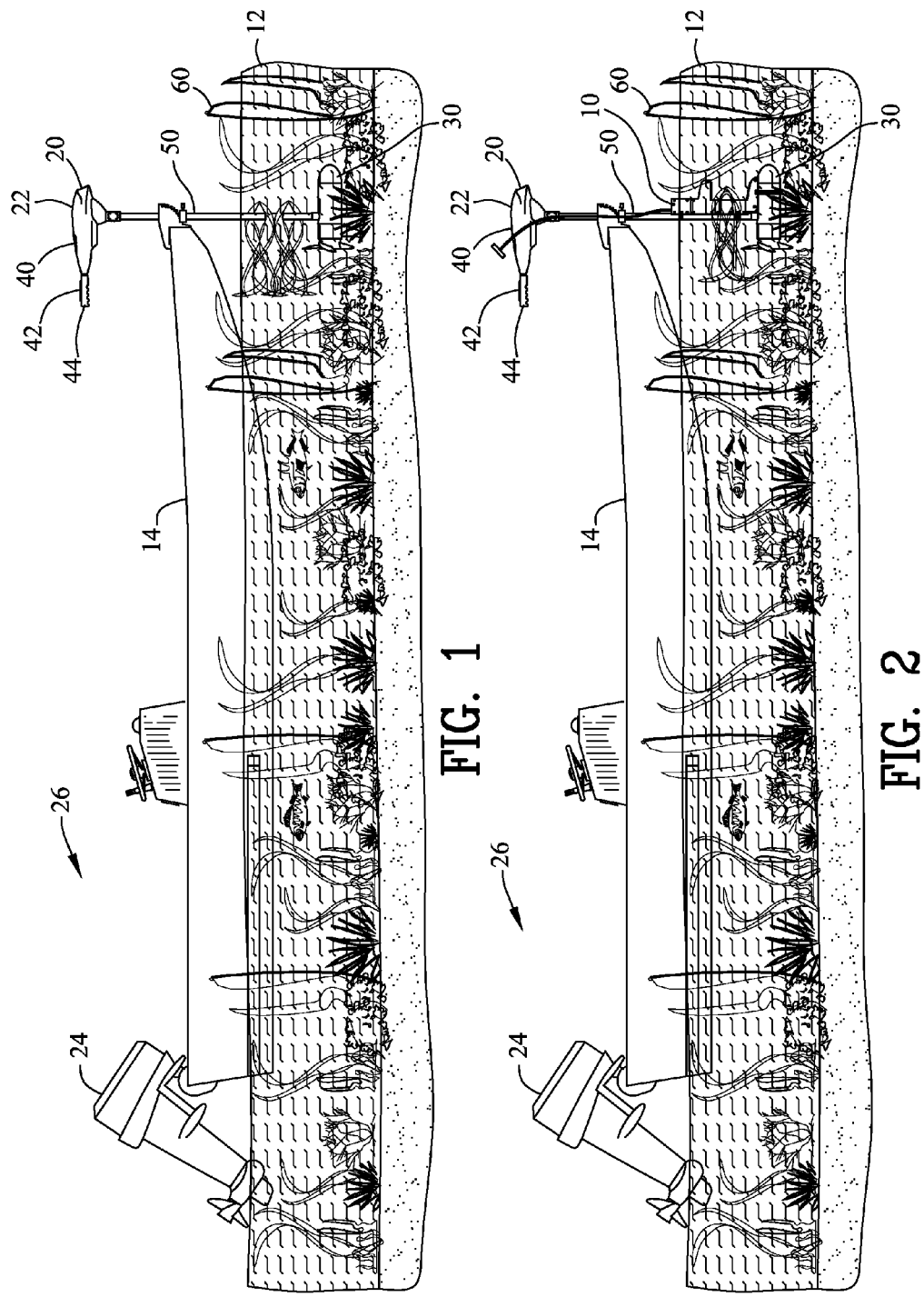

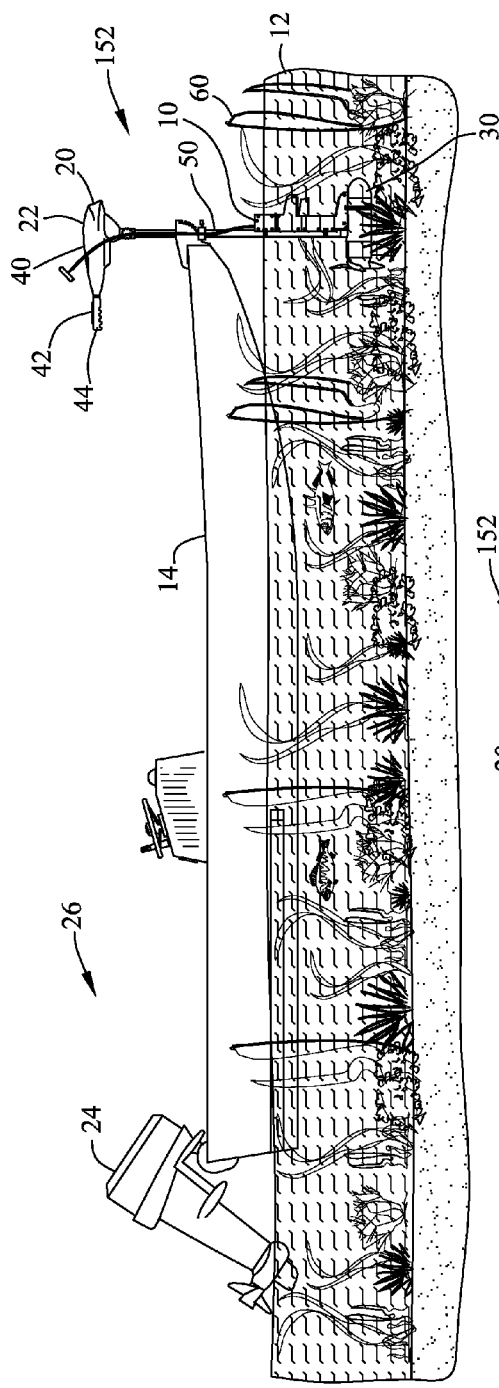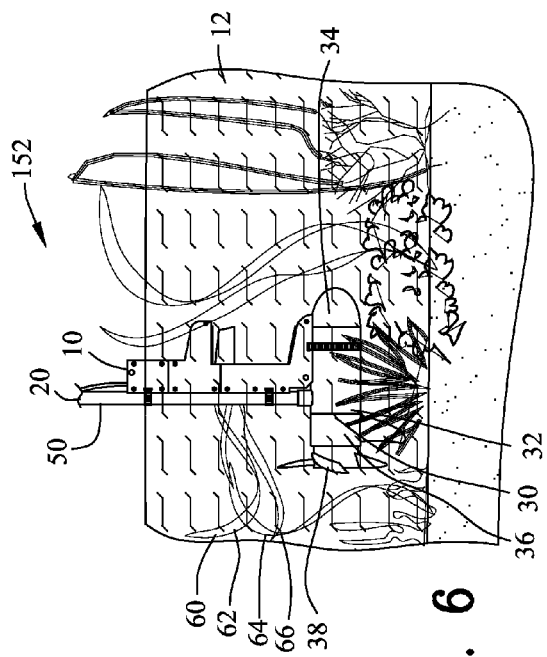
FIG. 5
FIG. 6

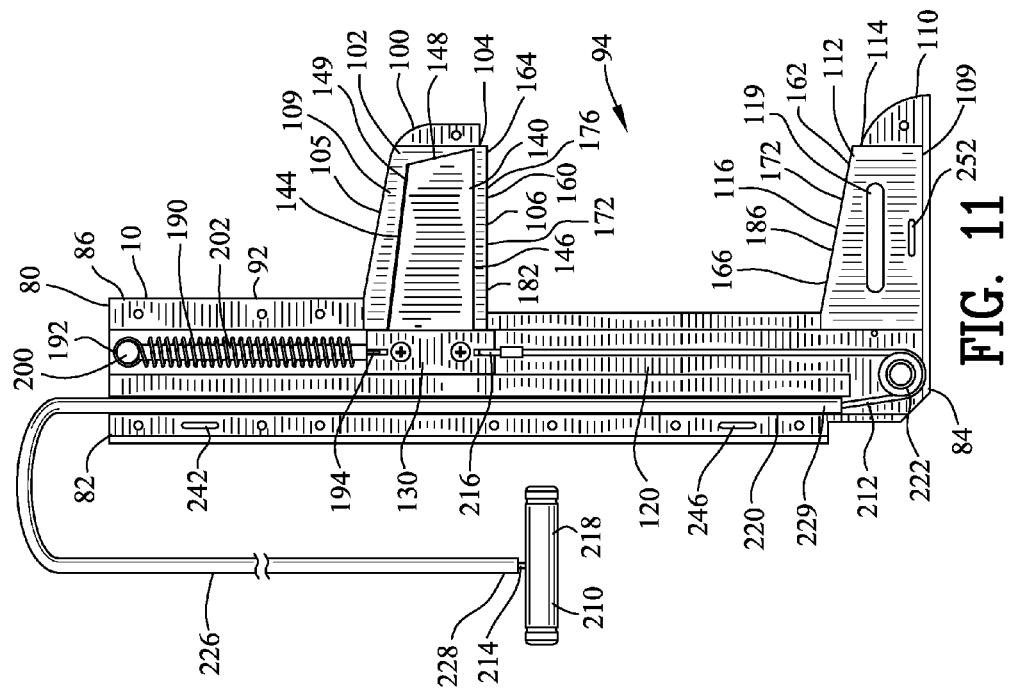
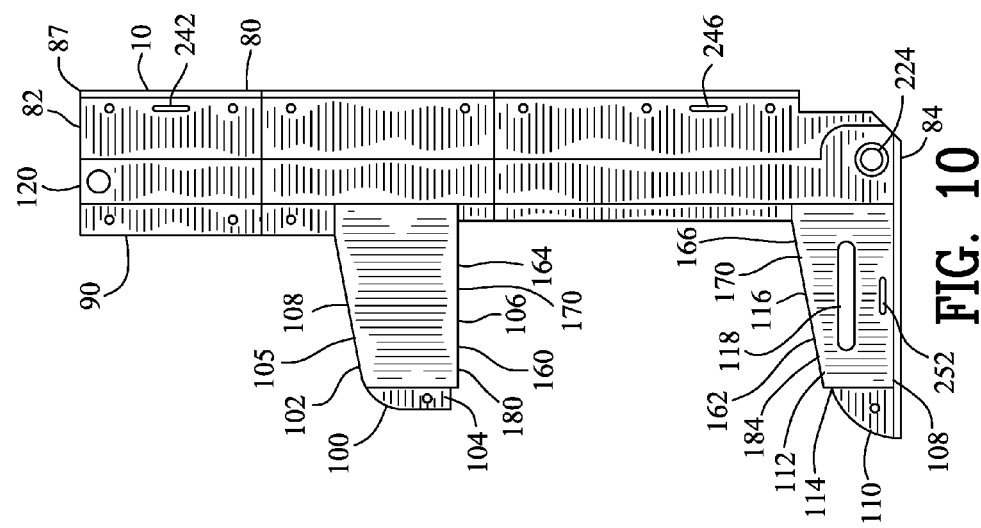

CUTTING DEVICE FOR WATER VESSEL

CROSS-REFERENCE TO RELATED APPLICATIONS

This application claims benefit of U.S. Patent Provisional application No. 62/013,538 filed Jun. 18, 2014. All subject matter set forth in provisional application Ser. No. 62/013,538 is hereby incorporated by reference into the present application as if fully set forth herein.

This application claims benefit of U.S. Patent Provisional application No. 62/062,432 filed Oct. 10, 2014. All subject matter set forth in provisional application Ser. No. 62/062,432 is hereby incorporated by reference into the present application as if fully set forth herein.

BACKGROUND OF THE INVENTION

Field of the Invention

This invention relates to a cutting device and more particularly to a cutting device coupled to a water vessel propelling device.

Background of the Invention

With the invention of the electric trolling motor in 1934, it joined the ranks of low horsepower motors used on small boats. Many of these boat/motor combinations are used in weed infested waters by fishermen, hunters and the like. The problem of aquatic vegetation fouling the motor and propeller has consistently plagued users.

Attempts to solve the fouling problem have primarily centered about development of "weedless" propellers. Although some level of success has been achieved in the development of these devices, aquatic vegetation fouling of the motor tube, which extends from the mounting point on the boat downward to the propeller assembly continues to cause problems for the user.

There have been many in the prior art who have attempted to solve these problems with varying degrees of success. None, however completely satisfies the requirements for a complete solution to the aforestated problem. The following U. S. patents are attempts of the prior art to solve this problem.

U.S. Pat. No. 4,224,893 to Vollmar discloses a weed guard for electric trolling motors including a generally semi-cylindrical lower portion to embrace the bottom portion of the electric motor and a forwardly upwardly angle portion from the lower portion, terminating at a point somewhat above the normal water line.

U.S. Pat. No. 4,651,420 to Lonnecker discloses a cutter of standing vegetation having a boom to which is connected at one end a hinge from which projects a reciprocating type sickle, and is suspended centrally from a pivoting handle. A control rod is connected to the pivoting handle and runs parallel to the greater length of the boom. The rod is further connected in a pivoting fashion to a control lobe which is connected at right angles to the nonmoving part of the sickle. A motor and gearbox assembly which produces reciprocating motion is mounted at the other end of the boom and has a reciprocating power-take-off to which is clamped a reciprocating flexible drive shaft. The drive shaft runs to and is clamped upon the moving part of the sickle and is supported, braced, and channeled, by a flexible covering which terminates in two extension points. One extension point is near the reciprocating power takeoff, the other of which is near the moving part of the sickle, which terminates in another reciprocating power-take-off to which a detachable saw blade is mounted.

U.S. Pat. No. 4,718,871 to Mendelevitch discloses an upper and a lower blade fixed together at an adjustable angle and having means for mounting same on the leading edge of the propeller drive housing of an inboard/outboard motor to cut kelp and other seaweed which would otherwise foul the prop and clog the cool, sea water input vents. The cutter has adjustable brackets which will accommodate a wide variety of different types of propeller drive housings, and will accommodate outboard motors as well as inboard motors, and will even fit on the advance edge a sailboat keel. In one embodiment, it has a combination brace/mesh screen which extends from the cutter to the propeller drive housing in front of the cooling water inlets to keep bits of seaweed and other debris from entering and clogging the cooling system, causing overheating the destruction of the motor.

U.S. Pat. No. 4,801,281 to Govan discloses a device mounted in encircling relation to a propeller shaft. The device cuts lines, nets and weeds, thus preventing entanglement of the propeller and preventing entanglement damage which may result to the parts of the driven assembly of the outboard, inboard/outboard or trolling motor used to propel vessels through the water. The device includes a non-rotatable, annular cutting ring member having one or more double-edged cutting blades, disposed in sandwiched relation to two rotatable annular members. One of the rotatable members carries no cutting blades, and the second rotatable member carries a plurality of double-edged, circumferentially spaced blades that individually cooperate with the non-rotatable blade in a shearing action. The non-rotatable member includes a protruding, forwardly expanding, wedge member, the wedge member being configured to define a forwardly opening wedge-shaped cavity. The protruding wedge members cavity enters into abutting engagement with the propeller shaft housing attendant rotation of the propeller shaft. The propeller shaft housing enters into fine engagement with the forwardly opening wedge-shaped cavity substantially instantaneously upon the introduction of a load on the apparatus.

U.S. Pat. No. 4,902,255 to Faunda discloses a weedguard for attachment to electric trolling motors having a motor housing and a motor support shaft. The weedguard comprises a lower triangular frame member portion and an upper arm portion. The triangular frame portion has a flange for attachment to the motor housing so that the triangular frame portion has one apex toward the front of the motor housing and extends downwardly and rearwardly from the apex with respect to the motor housing. The upper arm portion is secured to the triangular frame portion at that apex and extends upwardly and forwardly therefrom. A rearward extension member extends from the upper arm portion toward the motor shaft for attachment to the motor shaft.

U.S. Pat. No. 4,911,664 to Gremillion discloses a weed cutting and shredding attachment for an electric trolling motor. The invention includes a sharpened cutting blade oriented with the sharp edge thereof adjacent to the path of movement of the leading edge of the propeller blades on an electric trolling motor together with a mounting structure for effectively mounting the cutting element from the trolling motor.

U.S. Pat. No. 4,925,412 to Karls discloses a weed deflector provided by a bar mounted to the driveshaft housing of a marine drive. The bar has a top portion extending forwardly from the driveshaft housing to a forward leading tip and has a lower portion bent downwardly and rearwardly and tapered back to and mounted to the driveshaft housing. The space between the forward leading tip and the driveshaft housing is open so that it does not affect steering of the marine drive. The tapered portion of the bar forces weeds to slide downwardly and rearwardly therealong and off of the driveshaft housing. The bar prevents weeds from wrapping around the strut portion and covering cooling water inlets or interfering with the propeller or propeller efficiency.

U.S. Pat. No. 5,178,565 to Jacobson discloses a guard attachable to the lower unit of an outboard motor preventing direct impact between submerged hazards and the elements of the lower unit. The guard includes two angle brackets, a rigid bar attached to the angle brackets at a top end, and a skeg pocket and fin attached to a lower portion of the bar. The guard descends from a position forward of and substantially level with, the cavitation plate to a point below the skeg. The guard prevents damage to the entire lower unit, including the propeller, upon impact with a submerged obstacle.

U.S. Pat. No. 5,201,168 to Jenson discloses an underwater lake weed cutting apparatus which is adapted to be driven by an electric auger motor from the rear portion of a boat. The weed cutting apparatus includes an elongated drive shaft extending through an elongated tubular housing, wherein the drive shaft is driven by the motor to consequently reciprocate a sickle bar at a lower end thereof. A geared driving mechanism converts rotary motion of the drive shaft to a reciprocating motion of the sickle bar to reciprocate a first elongated toothed cutting blade with respect to an identical second toothed cutting blade to generate a scissors action. The scissors action of the sickle bar severs lake weeds as the apparatus is swept through the water proximate the lake bottom by a boat. The cutting apparatus can be adjusted to various depths of water to facilitate cutting lake weeds proximate the root structure near the lake bottom. The invention provides a mechanized method of cutting lake weeds such that the task of cutting lake weeds requires less labor, and wherein the cutting apparatus is easily maneuverable around fixed structures such as docks. The invention comprises mostly aluminum steel parts such that it is relatively light weight. Since the sickle bar comprises reciprocating blades, weeds do not have a tendency to build up upon the cutting apparatus. The invention is portable and can be adapted to the front wall of a boat as well, and further, the cutting apparatus can be angled from the boat at a preselected angle to facilitate viewing the cutting blades as they are swept through the lake to cut the weeds.

U.S. Pat. No. 5,430,998 to Albrecht discloses an aquatic weed cutter having a continuous cable strung along the horizontal and vertical members of an inverted T-shaped cable frame. The cable is moved by a motor drive in a circuit between opposed sheaves on the ends of the horizontal and vertical members. The drive comprises a pair of engaging belts which hold the cable therebetween and drive it about the circuit. Cutting clips are attached at spaced intervals to the cable for cutting the stems of underwater plants.

U.S. Pat. No. 5,807,150 to Minter, Sr. discloses a blade system for mounting on a marine motor such as an electric trolling motor. The device cuts weeds and other aquatic vegetation that normally entangle the submerged motor and propeller. In a first embodiment the blade system is characterized by a fixed installation in which one or more blades are mounted directly on the motor, or blade mounts are molded or cast into the motor to receive the blades. The blades are typically secured to the motor or blade mounts by bolts and extend toward the propeller, preferably in angular relationship with respect to the longitudinal axis of the motor housing, to cut the aquatic vegetation as the submerged motor operates. In a second embodiment the blade system can be implemented as a retrofit, wherein the blades are bolted or otherwise mounted on the motor or on removable blade mounts secured to the motor by means of one or more hose clamps. The blades are typically secured to the removable blade mounts by means of bolts to position the blades in essentially the same configuration on the motor as in the fixed mount embodiment.

Although the aforementioned prior art have contributed to the development of the art of preventing boat motor fouling by aquatic vegetation, none of these prior art patents have solved the needs of this art.

Therefore, it is an object of the present invention to provide an improved apparatus for removing accumulated aquatic vegetation from an outboard or trolling motor.

Another object of this invention is to provide an improved apparatus for removing accumulated aquatic vegetation from an outboard or trolling motor which is easy to install on and existing motor.

Another object of this invention is to provide an improved apparatus for removing accumulated aquatic vegetation from an outboard or trolling motor that is simple for the operator to use.

Another object of this invention is to provide an improved apparatus for removing accumulated aquatic vegetation from an outboard or trolling motor that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved cutting device. The cutting device is coupled to a water vessel propelling device. The water vessel propelling device has a lower unit submerged within a body of water, an upper unit elevated above the body of water and a shaft coupling the lower unit with the upper unit. A foreign object is positioned within the body of water. The cutting device comprises a base extending between a proximal end and a distal end and is coupled to the shaft. An upper arm is coupled to the base. A lower arm is coupled to the base. A track extends along the base. A blade is slidably engaged within the track for displacing the blade between the upper arm and the lower arm. An actuator displaces the blade relative to the track. A cutting edge is on the blade for severing the foreign object that is positioned between the upper arm and the lower arm of the base.

In a more specific embodiment of the invention, the blade includes an upper cutting edge and a lower cutting edge. The upper cutting edge severs the foreign object upon the blade being displaced in an ascending direction. The lower cutting edge severs the foreign object upon the blade being displaced in a descending direction.

In another more specific embodiment of the invention, a return spring extends between a proximal end and a distal end and positioned within the track. The proximal end of the return spring is coupled to the proximal end of the base. The distal end of the return spring is coupled to the blade. The return spring expands upon the actuator displacing the blade from the upper arm to the lower arm. The return spring contracts and forces the blade from the lower arm to the upper arm upon disengagement of the actuator.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 1 is a side view of a trolling motor accumulating weeds while propelling a vessel over a body of water;

FIG. 2 is a view similar to FIG. 1, wherein a weed cutting device is coupled to the trolling motor;

FIG. 5 is a view similar to FIG. 3, wherein the blade of the cutting device is displaced in an ascending direction for severing the weeds encompassing the trolling motor;

FIG. 6 is an enlarged portion of FIG. 5;

FIG. 10 is an interior view of a first half section of the cutting device;

FIG. 11 is an interior view of a second half section of the cutting device;

Similar reference characters refer to similar parts throughout the several Figures of the drawings.

DETAILED DISCUSSION

Figure 3:
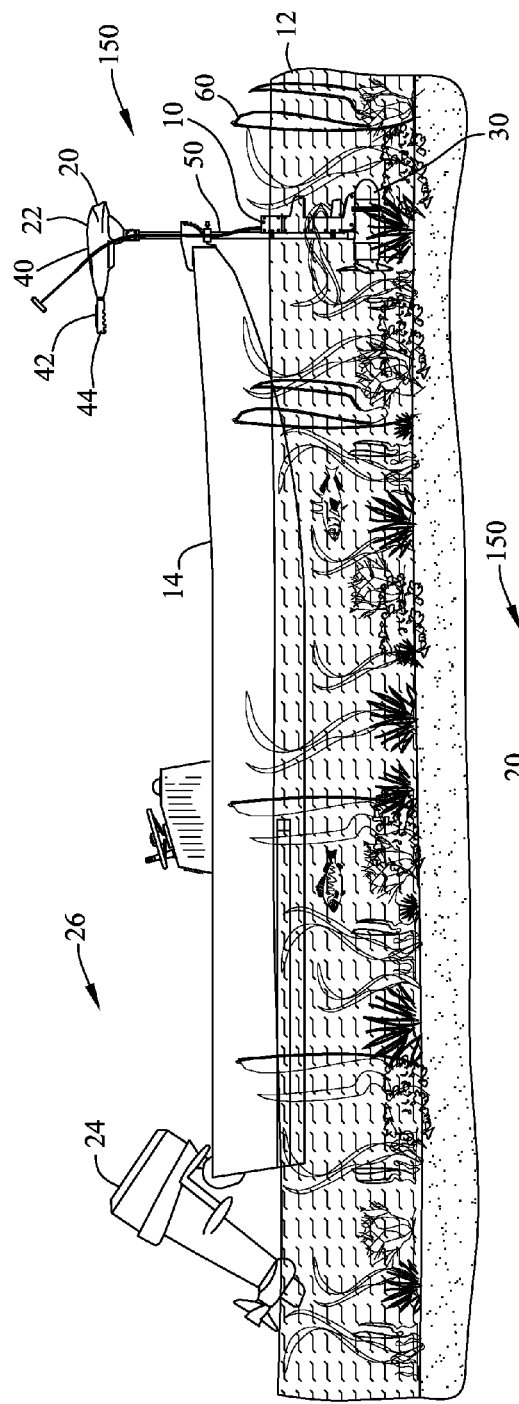
FIG. 3 is a view similar to FIG. 2, wherein a blade of the cutting device is displaced in a descending direction for severing the weeds encompassing the trolling motor.

FIGS. 1-13 illustrate a cutting device 10 that is coupled to a water vessel propelling device 20. The water vessel propelling device 20 may include but not limited to a marine trolling motor 22, an outboard marine engine 24, a water jet device 26 or other water propelling devices. The water vessel propelling device 20 may include a lower unit 30 submerged within a body of water 12. The lower unit 30 may include a housing 32 for encapsulating an electric motor 34 or lower gear unit 36. An upper unit 40 is elevated above the body of water 12 and may include control units 42 and steering device 44 for the water vessel propelling device 20. A shaft 50 extends between the lower unit 30 and the upper unit 40. Attached to the housing 32 is a propeller 38 for providing thrust and displacing a water vessel 14 through the body of water 12.

As shown in FIGS. 1-6, a foreign object 60 that resides within the body of water 12 may become entangled or encircled around the shaft 50. The drag upon the shaft 50 from one or more foreign objects 60 greatly increases upon the accumulation of the foreign objects 60 around the shaft 50 and as such reduces the water vessel's 14 overall speed over the body of water 12. The foreign objects 60 may include but not limited to weeds 62, fishing line 64 nets 66 or other objects.

As shown in FIGS. 1-13, the cutting device 10 includes a base 80 extending between a proximal end 82 and a distal end 84. An upper arm 100 and a lower arm 110 extend from the base 80. The base 80, upper arm 100 and lower arm 110 may form a general F-shape 86. The base 80, upper arm 100 and lower arm 110 may be constructed from a first half section 90 and a second half section 92 that are coupled together by fasteners, adhesive or other fastening means. The base 80, the upper arm 100 and the lower arm 110 define a collection area 94. The collection area 94 maintains the foreign objects 60 between the base 80, upper arm 100 and lower arm 110 and prohibits the foreign objects 60 from contacting the shaft 50 and from contacting the lower unit 40.

A track 120 extends along the base 80. Preferably, the track 120 extends within the base 80 and may be defined by a first half track 122 and a second half track 124 within the first half section 90 and the second half section 92 respectively. A sliding block 130 slidably engages within the track 120 and travels between the upper arm 100 and the lower arm 110.

Figure 4:
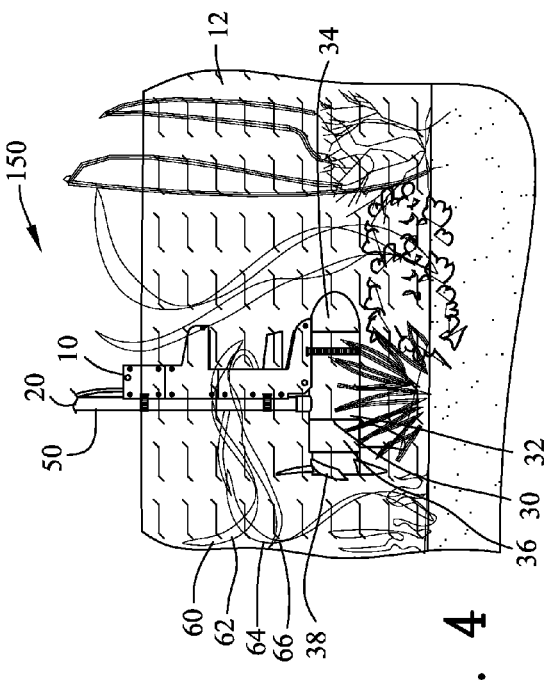
FIG. 4 is an enlarged portion of FIG. 3.
Figure 7:
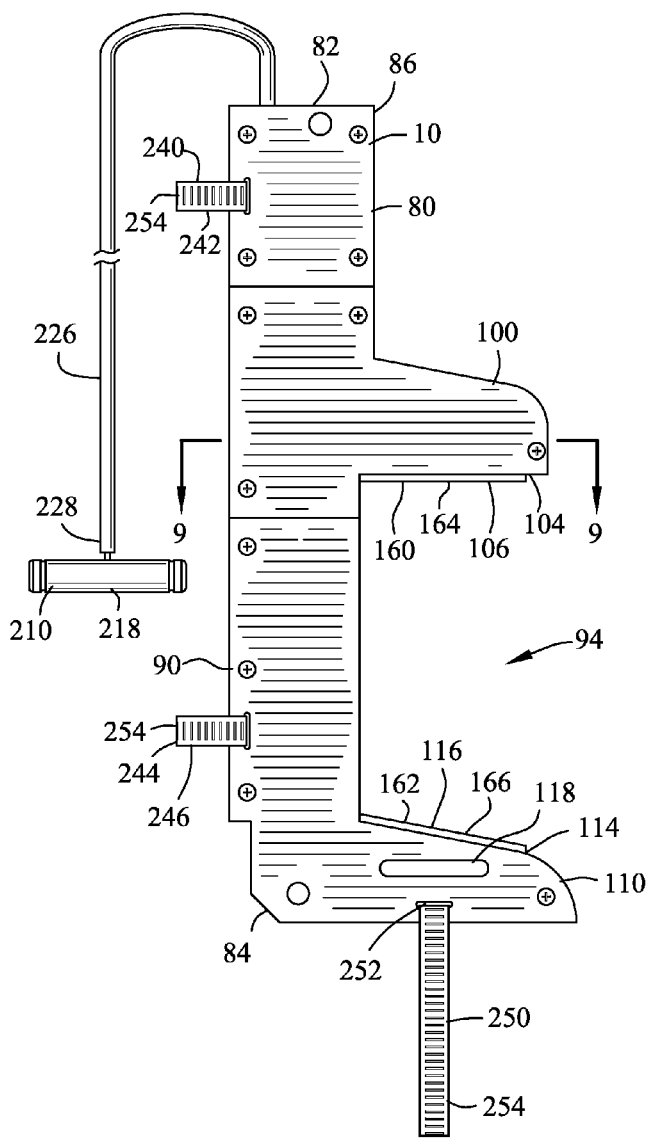
FIG. 7 is a side view of the cutting device of FIG. 2.
Figure 8:
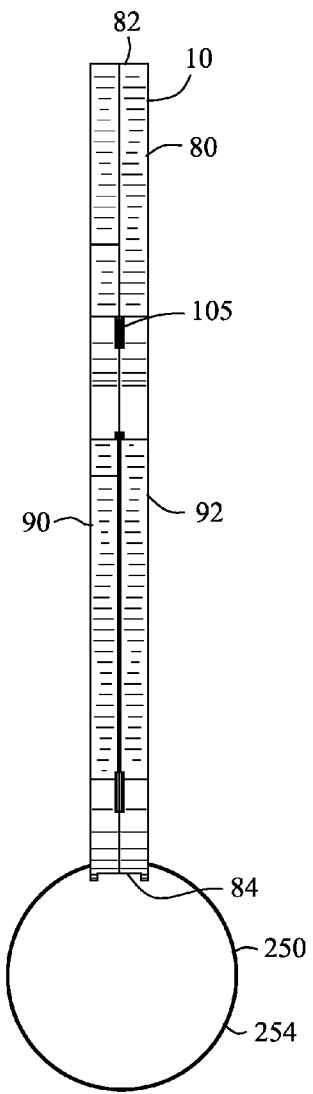
FIG. 8 is a right view of FIG. 7.
Figure 9:
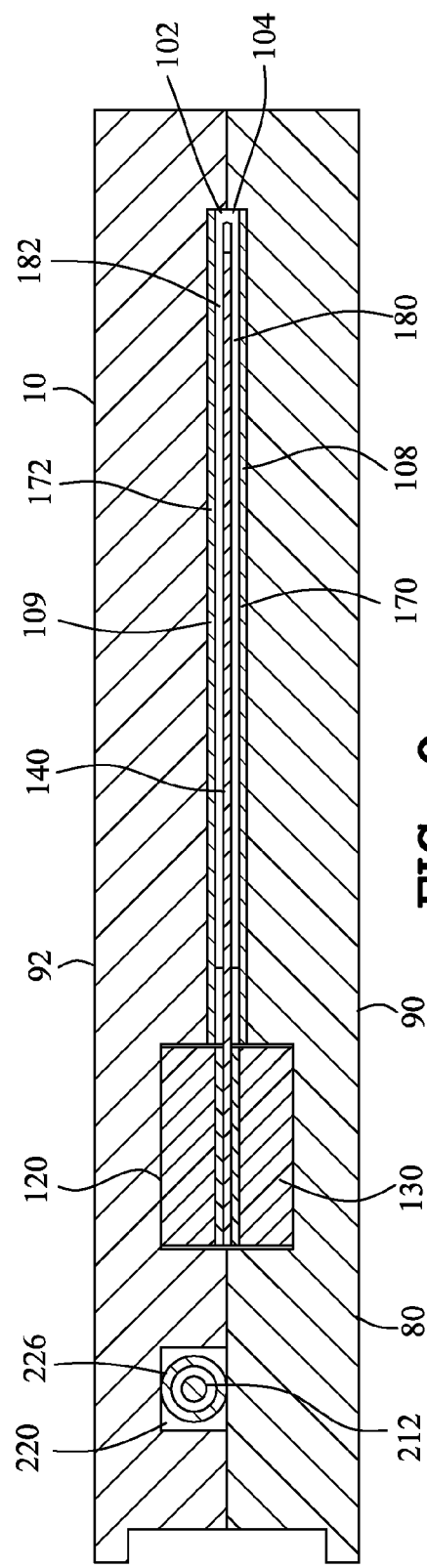
FIG. 9 is a sectional view along line 9-9 in FIG. 7.
Figure 12:
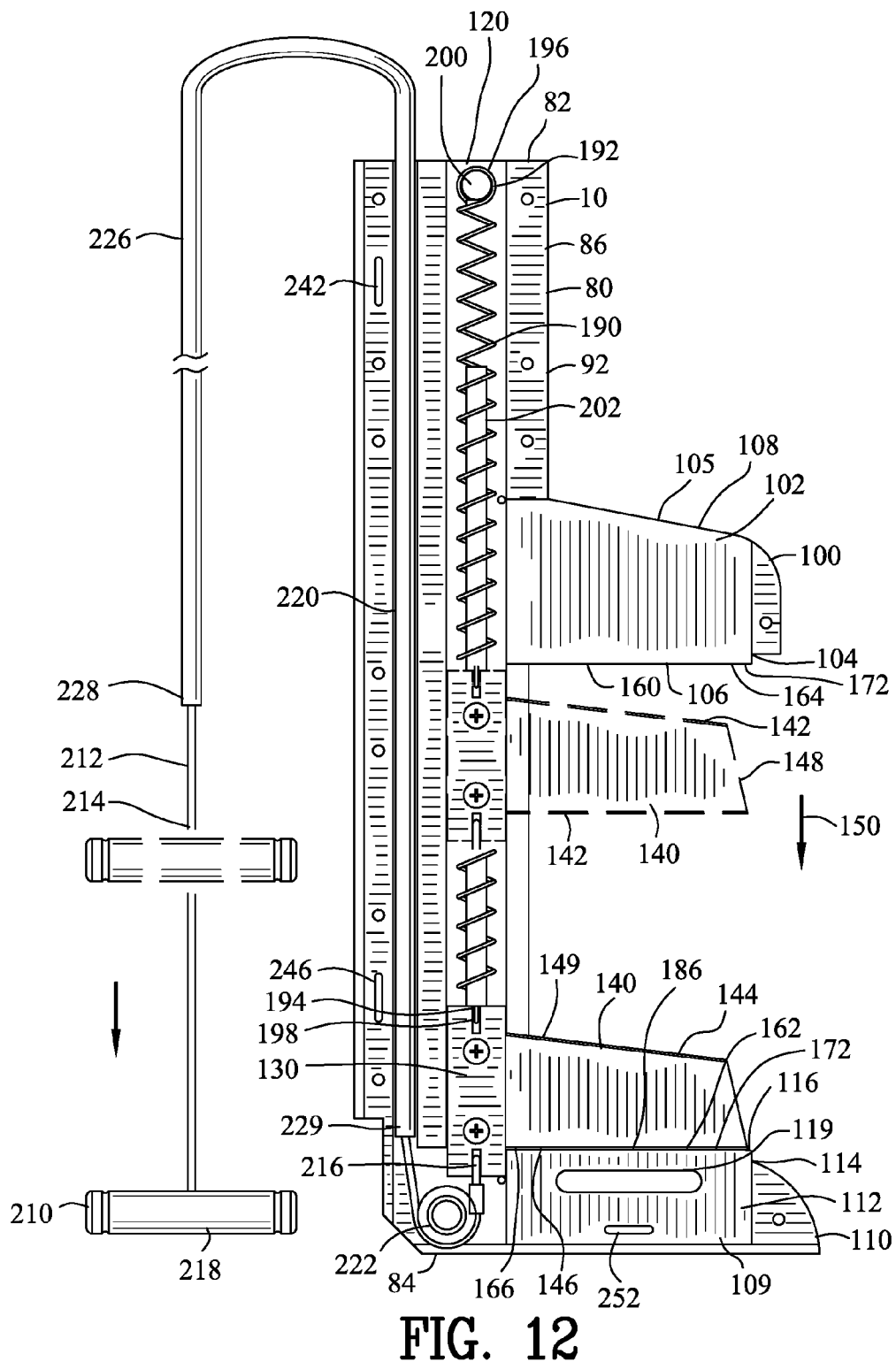
FIG. 12 is a view similar to FIG. 11 illustrating the displacement of an actuator causing a descending displacement of the blade.
Figure 13:
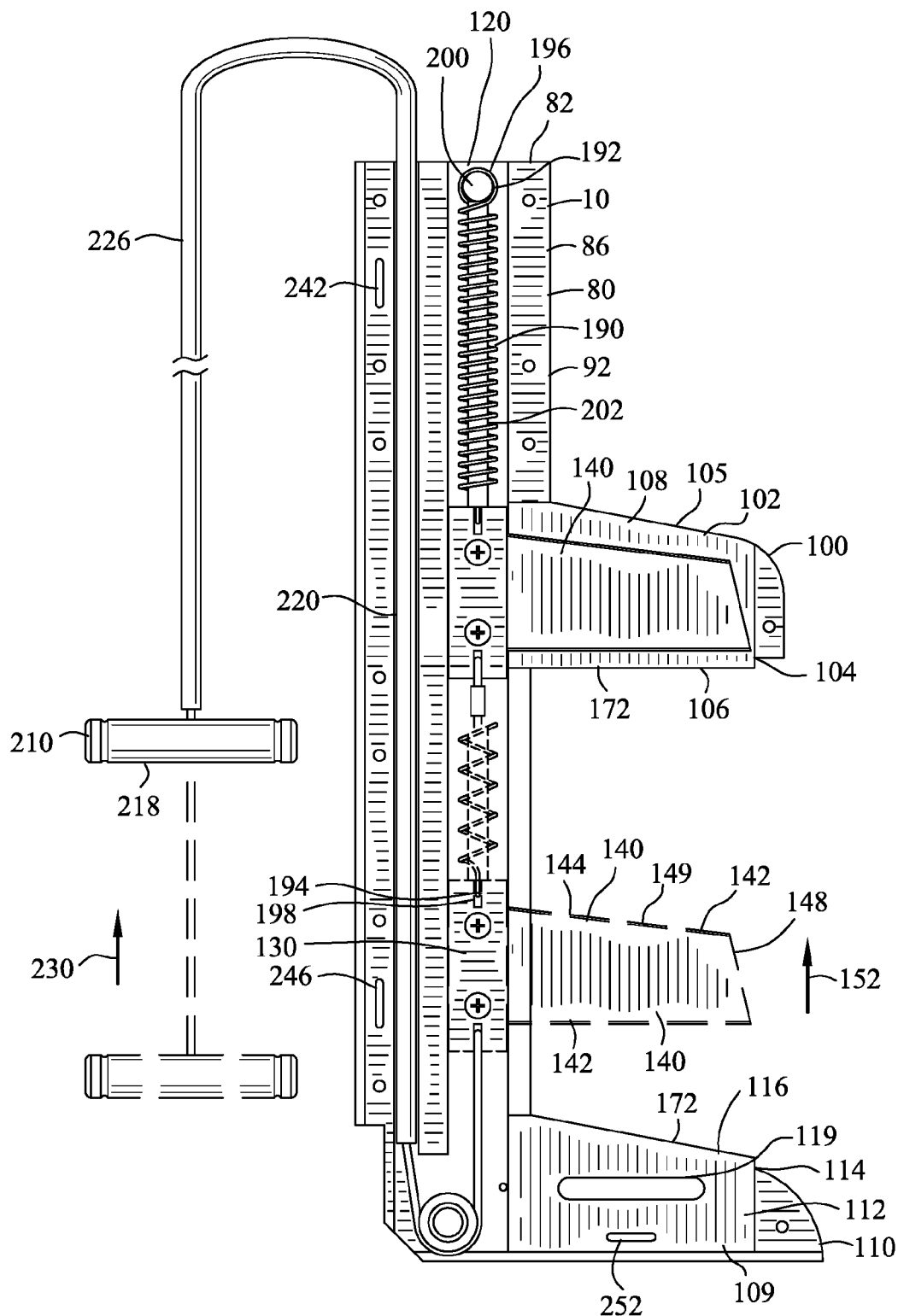
FIG. 13 is a view similar to FIG. 12 illustrating a return spring causing an ascending displacement of the blade.

A blade 140 is coupled to the sliding block 130 for displacing the blade 140 between the upper arm 100 and the lower arm 110. A cutting edge 142 is on the blade 140 for severing the foreign object 60 that is positioned between the upper arm 100 and the lower arm 110 and adjacent to the base 80. The blade 140 may include an upper cutting edge 144, a lower cutting edge 146 and an angled cutting edge 148. As shown in FIGS. 12 and 13, the upper cutting edge and the angled cutting edge 148 severs the foreign object 60 upon the blade 140 being displaced in an ascending direction 150. As shown in FIGS. 3, 4 and 12, the lower cutting edge 146 severs the foreign object 60 upon the blade 140 being displaced in a descending direction 152.

As best shown in FIGS. 7-13, the upper arm 100 includes an upper cavity 102 defining an upper groove 104. The upper groove 104 has a descending orientation 106. The blade 140 may traverse the upper groove 104 for positioning the blade 140 within the upper cavity 102. The lower arm 110 includes a lower cavity 112 defining a lower groove 114. The lower groove 114 has an ascending orientation 116. The blade 140 may traverse the lower groove 114 for positioning the blade 140 within the lower cavity 112. Preferably, the upper cavity 102 and the lower cavity 112 are defined by a first half cavity 108 and a second half cavity 109 within the first half section 90 and the second half section 92 respectively.

The upper arm 100 adjacent to the upper groove 104 defines an upper shearing surface 160. The lower arm 110 adjacent to the lower groove 114 defines a lower shearing surface 162. The upper arm 100 and the upper cutting edge 144 define an upper compound cutter 164 upon the upper cutting edge 144 traversing the upper shearing surface 160. As shown in FIGS. 12 and 13, the upper compound cutter 164 severs the foreign object 60 upon the upper cutting edge 144 traversing the upper shearing surface 160.

As best shown in FIGS. 8 and 10-13, the upper arm 100 may further include an upper discharge port 105. The upper discharge port 105 provides a passage from the upper cavity 102 to the exterior of the upper arm 100. As a result of the blade 140 and the upper cutting edge 144 shearing the foreign object(s) 60, fragments of the foreign object(s) 60 may become positioned within the upper cavity 102. The accumulation of large amounts of foreign object(s) 60 within the upper cavity 102 may result in the jamming of the blade 140 relative to the upper arm 100. To prevent the accumulation of the foreign object(s) 60 within the upper cavity 102, the upper discharge port 105 permits the fragments of the foreign object(s) 60 to be discharged from the upper cavity 102, through the upper discharge port 105 and to the exterior of the upper arm 100.

The lower arm 110 and the lower cutting edge 146 define a lower compound cutter 166 upon the lower cutting edge 146 traversing the lower shearing surface 162. As shown in FIGS. 3, 4 and 12, the lower compound cutter 166 severs the foreign object 60 upon the lower cutting edge 146 traversing the lower shearing surface 162.

As best shown in FIGS. 7 and 10-13, the lower arm 110 may further include a primary lower discharge port 118 and a secondary lower discharge port 119. The primary lower discharge port 118 and a secondary lower discharge port 119 provide a passage from the lower cavity 112 to the exterior of the lower arm 110. As a result of the blade 140 and the lower cutting edge 146 shearing the foreign object(s) 60, fragments of the foreign object(s) 60 may become positioned within the lower cavity 112. The accumulation of large amounts of foreign object(s) 60 within the lower cavity 112 may result in the jamming of the blade 140 relative to the lower arm 110. To prevent the accumulation of the foreign object(s) 60 within the lower cavity 112, the primary lower discharge port 118 and a secondary lower discharge port 119 permit the fragments of the foreign object(s) 60 to be discharged from the lower cavity 112, through either the primary lower discharge port 118 or the secondary lower discharge port 119 and to the exterior of the lower arm 110.

The upper arm 100 and lower arm 110 may further include a primary shearing blade 170 and a secondary shearing blade 172 coupled in the first half cavity 108 and the second half cavity 109 of the upper arm 100 and the lower arm 110 respectively. Preferably, the primary shearing blade 170 and a secondary shearing blade 172 protrude beyond the upper groove 104 and the lower groove 114.

The upper cutting edge 144 passes between the primary shearing blade 170 and a secondary shearing blade 172 of the upper arm 100 for defining a primary upper compound cutter 174 and a second upper compound cutter 176. As shown in FIGS. 12 and 13, the primary upper compound cutter 174 and the second upper compound cutter 176 severs the foreign object 60 upon the upper cutting edge 144 traversing the primary shearing blade 170 and a secondary shearing blade 172 of the upper arm 100.

The lower cutting edge 146 passes between the primary shearing blade 170 and a secondary shearing blade 172 of the lower arm 110 for defining a primary lower compound cutter 184 and a second lower compound cutter 186. As shown in FIGS. 3, 4 and 12, the primary lower compound cutter 184 and the second lower compound cutter 186 severs the foreign object 60 upon the lower cutting edge 146 traversing the primary shearing blade 170 and a secondary shearing blade 172 of the lower arm 110.

As best shown in FIGS. 12 and 13, the upper cutting edge 144 may include a tapered edge 149. The tapered edge 149 reduces the height of the blade 140 from the track 122 to the terminal end of the blade 140. The tapered edge 149 assists in sequentially cutting the foreign object 60 and reducing the force required for severing the foreign object 60 with the upper compound cutter 164.

As shown in FIGS. 12 and 13, a return spring 190 extends between a proximal end 192 and a distal end 194 and positioned within the track 120. The proximal end 192 of the return spring 190 may include an upper ring 196 and the distal end 194 may include a lower ring 198. The return spring 190 is positioned within the track 120. The upper ring 196 of the return spring 190 encircles a spring mounting shaft 200 positioned within the track 120. The lower ring 198 of the return spring 190 engages the sliding block 130.

As best shown in FIGS. 3, 4 and 12, upon the activating an actuator 210 the blade 140 is displaced relative to the track 120 in a descending direction from the upper arm 100 to the lower arm 110. Upon the displacement of the blade 140 in a descending direction the return spring 190 expands. As best shown in FIGS. 5, 6 and 13, upon the deactivation of the actuator 210 the return spring 190 contracts and forces the blade 140 along the track 120 in an ascending direction from the lower arm 110 to the upper arm 100. A stop shaft 202 is positioned within the return spring 190. The stop shaft 202 terminates the ascending displacement of the blade 140 upon the stop shaft 202 contacting the spring mounting shaft 200 and the sliding block 130.

The actuator includes a cable 212 extending between a proximal end 214 and a distal end 216. The distal end 216 of the cable 212 is coupled to the sliding block 130. The proximal end 214 of the cable 212 extends above the body of water 12. As shown in FIG. 12, the cable 212 is displaced by a pulling force 230 for expanding the return spring 190 and displaces the blade 140 from the upper arm 100 to the lower arm 110. As shown in FIG. 13, once the pulling force 230 has been removed from the cable 212 the return spring 190 contracts and displaces the blade 140 from the lower arm when 10 to the upper arm 100.

As shown in FIGS. 9 and 11-13, a channel 220 extending along the base 80. A pulley 222 is coupled to the distal end 84 of the base 80 and adjacent to the channel 220. The pulley 222 may be secured to the base 80 by a pulley mounting shaft 224. A cable conduit 226 extends between a proximal end 228 and a distal end 229. The distal end 229 of the cable conduit 226 is secured within the channel 220. The proximal end 228 of the cable conduit 226 extends above the body of water 12. The cable 212 traverses the cable conduit 226 and encircling a portion of the pulley 222 and couples to the sliding block 130 for channeling and redirecting the cable 212. More specifically, the pulley 222 permits the cable 212 to exit the proximal end 82 of the base 80.

The cutting device 10 may be coupled to the water vessel propelling device 20 by one or more clamps. For example, an upper clamp 240 may engages an upper clamp aperture 242 in the proximal end 82 of the base 80 and encircle the shaft 50 of the water vessel propelling device 20. A lower clamp 244 may engage an lower clamp aperture 246 in the distal end 84 of the base 80 and encircle the shaft 50 of the water vessel propelling device 20. The upper clamp 240 and the lower clamp 244 may include hose clamps 254 for coupling the base 80 to the water vessel propelling device 20.

In addition, an arm clamp 250 may engage the lower arm 110 and encircle the lower unit 30 of the water vessel propelling device 20. The arm clamp 250 may include a hose clamp 254 for coupling the lower arm 110 to the water vessel propelling device 20.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A cutting device coupling to a water vessel propelling device, the water vessel propelling device having a lower unit submerged within a body of water, an upper unit elevated above the body of water and a shaft coupling the lower unit with the upper unit, a foreign object positioned within the body of water, the cutting device comprising:
    a base extending between a proximal end and a distal end and coupled to the shaft;
    an upper arm coupled to said base;
    a lower arm coupled to said base;
    a track extending along said base;
    a blade slidably engaged within said track for displacing said blade between said upper arm and said lower arm;
    an actuator for displacing said blade relative to said track;
    a cutting edge on said blade for severing the foreign object that is positioned between said upper arm and said lower arm of said base;
    an upper clamp engaging said proximal end of said base and encircling the shaft of the water vessel propelling device;
    a lower clamp engaging said distal end of said base and encircling the shaft of the water vessel propelling device; and
    said upper clamp and said lower clamp coupling said base to the water vessel propelling device.

2. A cutting device as set forth in claim 1, wherein said blade includes an upper cutting edge and a lower cutting edge;
    said upper cutting edge severing the foreign object upon said blade being displaced in an ascending direction; and
    said lower cutting edge severing the foreign object upon said blade being displaced in a descending direction.

3. A cutting device as set forth in claim 2, wherein said upper arm includes an upper cavity for positioning said blade within said upper arm;
    said lower arm includes a lower cavity for positioning said blade within said lower arm;
    said upper arm defining an upper shearing surface adjacent to said upper cavity and having a descending orientation relative to said base;
    said lower arm defining a lower shearing surface adjacent to said lower cavity and having a ascending orientation relative to said base;
    said upper arm and said upper cutting edge defining an upper compound cutter upon said upper cutting edge traversing said upper shearing surface; and
    said lower arm and said lower cutting edge defining a lower compound cutter upon said lower cutting edge traversing said lower shearing surface.

4. A cutting device as set forth in claim 3, wherein said upper arm and said lower arm include a primary shearing blade and a secondary shearing blade;
    said upper cutting edge passing between said primary shearing blade and said secondary shearing blade of said upper arm for defining a primary upper compound cutter and a second upper compound cutter; and
    said lower cutting edge passing between said primary shearing blade and said secondary shearing blade of said lower arm for defining a primary lower compound cutter and a second lower compound cutter.

5. A cutting device as set forth in claim 3, wherein said upper cutting edge includes a tapered edge for sequentially cutting the foreign object and reducing the force required for severing the foreign object with said upper compound cutter.

6. A cutting device as set forth in claim 1, further including a return spring extending between a proximal end and a distal end and positioned within said track;
    said proximal end of said return spring coupled to said proximal end of said base;
    said distal end of said return spring coupled to said blade;
    said return spring expanding upon said actuator displacing said blade from said upper arm to said lower arm; and
    said return spring contracting and forcing said blade from said lower arm to said upper arm upon disengagement of said actuator.

7. A cutting device as set forth in claim 6, wherein said actuator includes a cable extending between a proximal end and a distal end;
    said distal end of said cable coupled to said blade;
    said proximal end of said cable extending above the body of water;
    said cable being displaced by a pulling force for expanding said return spring and displacing said blade from said upper arm to said lower arm; and
    said pulling force removed from said cable for contracting said return spring and displacing said blade from said lower arm to said upper arm.

8. A cutting device as set forth in claim 7, further including a channel extending along said base;
    a pulley coupled to said distal end of said base and adjacent to said channel;
    a cable conduit extending between a proximal end and a distal end;
    said distal end of said cable conduit secured within said channel;
    said proximal end of said cable conduit extending above the body of water; and
    said cable traversing said cable conduit and encircling a portion of said pulley and coupling to said blade for permitting the cable to exit said proximal end of said base.

9. A cutting device as set forth in claim 1, further including an arm clamp engaging said lower arm and encircling the lower unit of the water vessel propelling device; and
    said arm clamp coupling said lower arm to the water vessel propelling device.

10. A cutting device coupling to a water vessel propelling device, the water vessel propelling device having a lower unit submerged within a body of water, an upper unit elevated above the body of water and a shaft coupling the lower unit with the upper unit, a foreign object positioned within the body of water, the cutting device comprising:
    a base extending between a proximal end and a distal end and coupled to the shaft;
    an upper arm coupled to said base;
    a lower arm coupled to said base;
    a track extending along said base;
    a blade slidably engaged within said track for displacing said blade between said upper arm and said lower arm;
    an actuator for displacing said blade relative to said track;

a cutting edge on said blade for severing the foreign object that is positioned between said upper arm and said lower arm of said base;

said blade includes an upper cutting edge and a lower cutting edge;

said upper cutting edge severing the foreign object upon said blade being displaced in an ascending direction;

said lower cutting edge severing the foreign object upon said blade being displaced in a descending direction;

said upper arm includes an upper cavity for positioning said blade within said upper arm;

said lower arm includes a lower cavity for positioning said blade within said lower arm;

said upper arm defining an upper shearing surface adjacent to said upper cavity and having a descending orientation relative to said base;

said lower arm defining a lower shearing surface adjacent to said lower cavity and having a ascending orientation relative to said base;

said upper arm and said upper cutting edge defining an upper compound cutter upon said upper cutting edge traversing said upper shearing surface; and said lower arm and said lower cutting edge defining a lower compound cutter upon said lower cutting edge traversing said lower shearing surface.

11. A cutting device coupling to a water vessel propelling device, the water vessel propelling device having a lower unit submerged within a body of water, an upper unit elevated above the body of water and a shaft coupling the lower unit with the upper unit, a foreign object positioned within the body of water, the cutting device comprising:

a base extending between a proximal end and a distal end and coupled to the shaft;

an upper arm coupled to said base;

a lower arm coupled to said base;

a track extending along said base;

a blade slidably engaged within said track for displacing said blade between said upper arm and said lower arm;

an actuator for displacing said blade relative to said track;

a cutting edge on said blade for severing the foreign object that is positioned between said upper arm and said lower arm of said base;

a return spring extending between a proximal end and a distal end and positioned within said track;

said proximal end of said return spring coupled to said proximal end of said base;

said distal end of said return spring coupled to said blade;

said return spring expanding upon said actuator displacing said blade from said upper arm to said lower arm; and said return spring contracting and forcing said blade from said lower arm to said upper arm upon disengagement of said actuator.

12. A cutting device coupling to a water vessel propelling device, the water vessel propelling device having a lower unit submerged within a body of water, an upper unit elevated above the body of water and a shaft coupling the lower unit with the upper unit, a foreign object positioned within the body of water, the cutting device comprising:

a base extending between a proximal end and a distal end and coupled to the shaft;

an upper arm coupled to said base;

a lower arm coupled to said base;

a track extending along said base;

a blade slidably engaged within said track for displacing said blade between said upper arm and said lower arm;

an actuator for displacing said blade relative to said track;

a cutting edge on said blade for severing the foreign object that is positioned between said upper arm and said lower arm of said base; and a clamp engaging said base and encircling the shaft of the water vessel propelling device for coupling said base to the water vessel propelling device.

\* \* \* \* \*